(12) United States Patent
Misra et al.

(10) Patent No.: US 6,806,000 B2
(45) Date of Patent: Oct. 19, 2004

(54) POST SEAL FOR LEAD ACID BATTERIES

(75) Inventors: Sudhan S. Misra, North Wales, PA (US); Drew D. Heimer, Lansdale, PA (US); Gregory Scharff, Conshohocken, PA (US)

(73) Assignee: C&D Charter Holdings, Inc., Wilmington, DE (US)

( * ) Notice: Subject to any disclaimer, the term of this patent is extended or adjusted under 35 U.S.C. 154(b) by 249 days.

(21) Appl. No.: 10/136,995

(22) Filed: May 1, 2002

(65) Prior Publication Data

US 2003/0207172 A1 Nov. 6, 2003

(51) Int. Cl.[7] .......................... H01M 2/08; H01M 2/02; H01M 4/56
(52) U.S. Cl. .................. 429/181; 429/175; 429/178; 429/225
(58) Field of Search ................. 429/181, 175, 429/178, 180, 184, 170, 225; 428/180, 181, 184

(56) References Cited

U.S. PATENT DOCUMENTS

| | | | |
|---|---|---|---|
| 3,652,340 A | 3/1972 | Sharpe et al. | 136/168 |
| 3,713,896 A | 1/1973 | Feldhake | 136/133 |
| 4,053,686 A | 10/1977 | Oxenreider | 429/91 |
| 4,076,908 A | 2/1978 | Bäcker et al. | 429/184 |
| 4,164,609 A | 8/1979 | Jensen | 429/183 |
| 4,212,934 A | 7/1980 | Salamon | 429/181 |
| 4,245,014 A | 1/1981 | Veit, Jr. et al. | 429/181 |
| 4,331,748 A | 5/1982 | Hardigg et al. | 429/175 |
| 4,430,396 A | 2/1984 | Hayes, Jr. | 429/184 |
| 4,455,356 A | 6/1984 | Barrett, Jr. | 429/66 |
| 4,495,260 A | 1/1985 | Hardigg et al. | 429/180 |
| 4,683,647 A | 8/1987 | Brecht et al. | 29/623.2 |
| 4,898,795 A | 2/1990 | Stocchiero | 429/66 |
| 5,053,296 A | 10/1991 | Stocchiero | 429/175 |
| 5,660,946 A | 8/1997 | Kump et al. | 429/180 |
| 6,312,852 B1 | 11/2001 | Wagner | 429/179 |

FOREIGN PATENT DOCUMENTS

GB    2123205    * 1/1984

OTHER PUBLICATIONS

"On the Development of a Long Life Post Seal for Stationary Batteries", S.S. Misra and T.M. Noveske, Intelec 2001. Proc. 28th Int. Telecom. Energy Conf., Paper 14.1 p. 238.

* cited by examiner

Primary Examiner—Patrick Ryan
Assistant Examiner—Thomas H. Parsons
(74) Attorney, Agent, or Firm—Hoffmann & Baron, LLP

(57) ABSTRACT

A terminal post seal arrangement for lead acid batteries is provided which may be used both as a moveable post seal or as a static post seal. In a first aspect of the subject invention, a battery is provided with an elastomeric sealing member rigidly fixed to both the cover of the battery and a bushing about a terminal post. Preferably, the sealing member includes a slack portion between its rigid connections which allows for relative movement between the bushing and the cover. In a second aspect of the subject invention, a collar is formed in the cover to bound the terminal post. The collar and/or the sealing member are formed at least partially tapered such that relative movement between the collar and the sealing member causes interferent engagement. It is preferred that interference between the collar and the sealing member become greater with increasing extent of relative movement.

53 Claims, 5 Drawing Sheets

POST SEAL FOR LEAD ACID BATTERIES

BACKGROUND OF THE INVENTION

This invention relates to post seal arrangements for lead acid batteries.

Sealing arrangements for lead acid batteries are well known in the prior art. Many of these designs rigidly fix a battery terminal post to the cover of the battery so as to seal the battery contents. Over the life of a lead acid battery, however, plate growth is experienced, particularly with positive lead plates, resulting in movement of the terminal post. As a result, stress is generated in the battery cover. Typically, the cover is formed of an acid-resistant thermoplastic, and cover failure has been noted resulting from plate growth. Such failure may curtail a lead acid battery's life span.

Various approaches have been taken to accommodate plate growth, including allowing for movement of the terminal post relative to the battery cover. These arrangements still provide a seal and have been referred to as "moveable" post seals. For example, moveable post seals have been developed, wherein a battery cover includes a flexible member (e.g., a bellows) that is connected to a terminal post bushing, such as in U.S. Pat. No. 4,455,356, which issued on Jun. 19, 1984 to Barrett, Jr.; U.S. Pat. No. 4,898,795, which issued Feb. 6, 1990 to Stocchiero; U.S. Pat. No. 5,053,296, which issued Oct. 1, 1991 to Stocchiero; U.S. Pat. No. 5,660,946, which issued Aug. 26, 1997 to Kump et al.; and, U.S. Pat. No. 6,312,852, which issued Nov. 6, 2001 to Wagner. With these designs, the flexible member flexes in response to outward movement of the terminal post, thereby avoiding stress build-up in the cover.

In an alternative approach, a terminal post is allowed to move freely within a surrounding sealing member, and/or has a sealing member mounted thereto which moves freely within a surrounding cooperating member, such as in U.S. Pat. No. 4,164,069, which issued Aug. 14, 1979 to Jensen; U.S. Pat. No. 4,212,934, which issued Jul. 15, 1980 to Salamon; U.S. Pat. No. 4,331,748, which issued May 25, 1982 to Hardigg, et al.; and, U.S. Pat. No. 4,495,260, which issued Jan. 22, 1985 to Hardigg, et al.

SUMMARY OF THE INVENTION

To overcome shortcomings of the prior art, a terminal post seal arrangement for lead acid batteries is provided herein which may be used both as a moveable post seal or as a static post seal. In a first aspect of the subject invention, a battery is provided having a cover with at least one aperture; a bushing formed to receive a terminal post of the battery disposed in registration with the aperture; and, a sealing member rigidly fixed to both the cover and bushing. The sealing member is preferably formed of different material from the cover, and more preferably, it is of an elastomeric material. The sealing member provides rigid (and hermetic) seals at both the cover and the bushing to prevent acid leakage from the battery. In addition, it is further preferred that the sealing member include a slack portion between its rigid connections which allows for relative movement between the bushing and the cover. Advantageously, the sealing member can allow for terminal post movement in response to plate growth without sacrificing seal integrity.

In a second aspect of the subject invention, a battery is provided having a cover with at least one aperture and a protruding collar that at least partially bounds the aperture. A bushing is also provided formed to receive a terminal post, with a sealing member being disposed between the bushing and the collar. The collar and/or sealing member are formed at least partially tapered such that relative movement between the collar and the sealing member causes interferent engagement. With such interferent engagement, a seal can be generated between the two elements. It is preferred that interference between the collar and the sealing member become greater with increasing extent of relative movement. Thus, the integrity of the seal generated between the two elements can increase with additional relative movement. With increasing plate growth, and corresponding terminal post movement, seal effectiveness about the terminal post may be increased over time.

These and other features of the subject invention will be better understood through a study of the following detailed description and accompanying drawings.

DETAILED DESCRIPTION OF THE INVENTION

Figure 1:
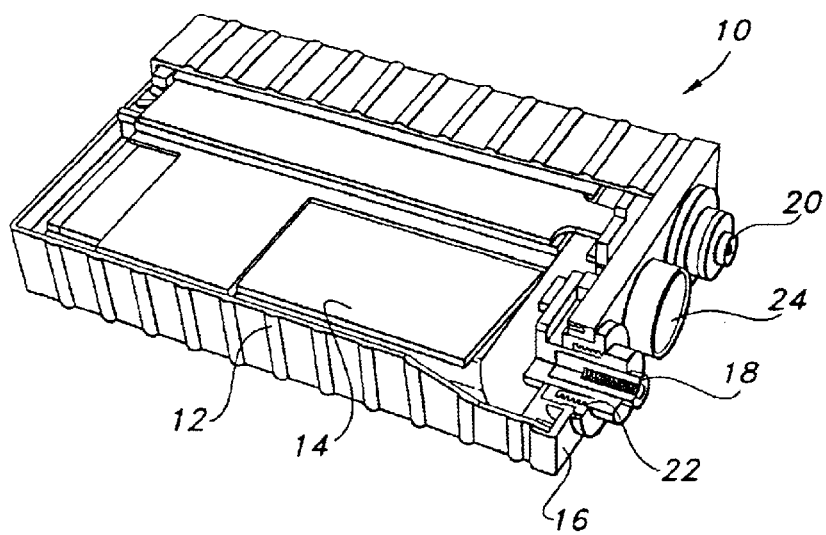
FIG. 1 is perspective partial cut-away view of a lead acid battery.

The subject invention is for use with a lead acid battery, such as that shown in partial cut away in FIG. 1 and generally designated with the reference numeral 10. The lead acid battery 10 is shown for illustrative purposes and the subject invention can be practiced with any lead acid battery known to those skilled in the art.

The lead acid battery 10 generally includes a jar 12 within which a plurality of positive and negative plates 14 are interspersingly housed with appropriately-disposed separator(s) and electrolyte. A cover 16 is disposed over one end of the jar 12 so as to seal the contents thereof. Positive and negative plates 14 are connected respectively to a positive terminal post 18 and a negative terminal post 20 using known techniques. The terminal posts 18 and 20 extend through apertures 22 formed in the cover 16. A valve-regulated vent 24 may also be provided in the cover 16 to stabilize excessive positive and/or negative pressure within the jar 12. The parts may be formed of conventional materials (e.g., the cover 16 may be formed of acid-resistant thermoplastic, such as PVC).

To allow for growth of the plates 14 (particularly of the positive plates) over the lifetime of the lead acid battery 10, a moveable post sealing arrangement 26 may be disposed between one or more of the terminal posts 18, 20 and their respective apertures 22. The sealing arrangement 26 allows for relative movement of the respective terminal post 18, 20 without loss of sealing integrity, and is particularly well-suited for use with the positive terminal post 18. Although the negative terminal post 20 does not substantially move over the course of the life span of the lead acid battery 10, the sealing arrangement 26 may nevertheless be used therewith.

Figure 2:
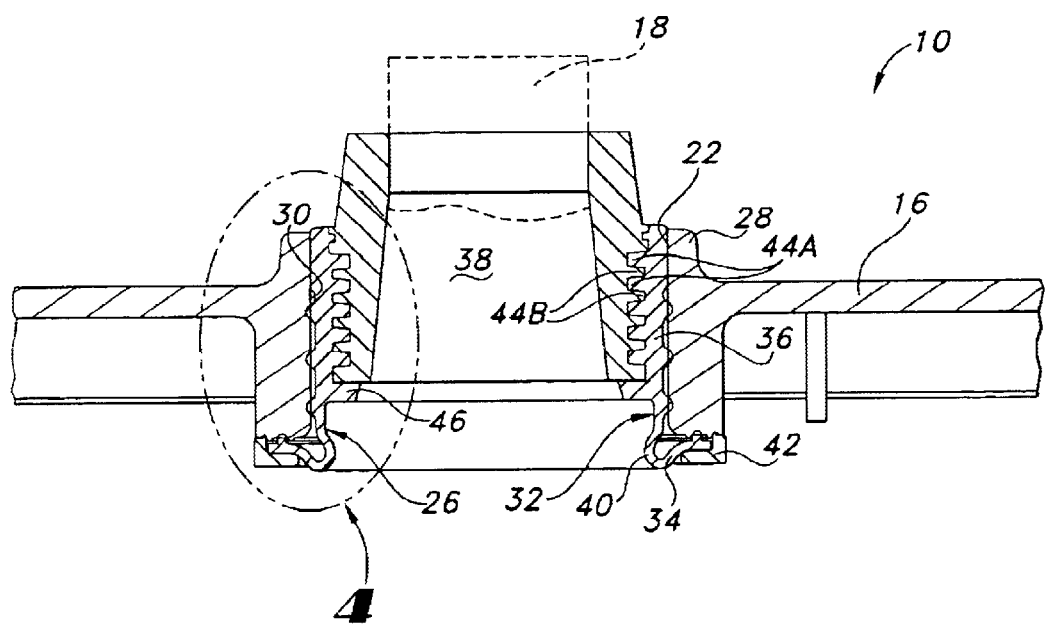
FIG. 2 is a cross-sectional view of a sealing arrangement in accordance with the subject invention.

With reference to FIG. 2, an enlarged cross-section of the sealing arrangement 26 is provided. As shown in FIG. 2, a collar 28 at least partially bounds the aperture 22, and preferably bounds its entirety. The collar 28 protrudes from the cover 16 preferably both inwardly and outwardly. As such, the aperture 22 is defined by an interior surface 30 of the collar 28 which has sufficient length to cause sealing in the sealing arrangement 26.

The sealing arrangement 26 also includes a sealing member 32, which is preferably formed of elastomeric (natural or synthetic) material, e.g., EPDM rubber. It is preferred that the sealing member 32 be of a different material from the cover 16. The sealing member 32 includes a first portion 34 which is rigidly fixed to the cover 16, preferably at the collar 28. The sealing member 32 also includes a second portion 36 which is rigidly fixed to a bushing 38 formed to receive and mount (preferably hermetically) onto one of the terminal posts 18, 20 of the lead acid battery 10. The bushing 38 is of conventional construction and may be metallic (typically lead). Any method known to those skilled in the art may be used to secure the bushing 38 to the terminal post 18, 20, such as welding. An intermediate slack portion 40 extends between and connects the first and second portions 34 and 36 of the sealing member 32.

The first portion 34 is preferably rigidly connected to the cover 16 through a compression seal generated by a sealing ring 42. Preferably, the sealing ring 42 is initially a separate element from the cover 16. During assembly, the first portion 34 of the sealing member 32 is placed over a portion of the cover 16, such as over a portion of the collar 28. Subsequently, the sealing ring 42 is placed over the first portion 34 to cause compression thereof, and a portion of the sealing ring 42 is joined to the cover 16, such as to the collar 28. It is preferred that the sealing ring 42 be joined so as to be hermetically-sealed to the cover 16, for example, by being fused thereto (e.g., by ultrasonic welding). The compressive force generated by the sealing ring 42 against the first portion 34 creates not only a clamping force to maintain the first portion 34 relative to the cover 16, but also provides a sealing effect about the first portion 34. Other techniques for rigidly fixing the first portion 34 to the cover 16 may be used.

The second portion 36 may be rigidly fixed to the bushing 38 through resilient inward compressive force of the sealing member 32 (due to its inherent resiliency) and/or through a series of interdigitated ribs 44a and 44b formed on the sealing member 32 and the bushing 38, respectively. The ribs 44a, 44b provide a tortuous path for any possible leakage, and thus provide a sealing effect about the bushing 38. In addition, the ribs 44a, 44b limit longitudinal movement of the sealing member along the bushing 38. To enhance the sealing effect, an enlarged rib 46 may be disposed below the bushing 38 to at least partially overlap a lower surface thereof. The sealing member 32 is preferably molded onto the bushing 38 using any known technique, such as the technique disclosed in U.S. Pat. No. 4,683,647. The disclosure of U.S. Pat. No. 4,683,647 is incorporated by reference herein in its entirety.

The slack portion 40 is preferably in an unstressed condition in an initial state, as shown in FIG. 2. As such, the slack portion 40 allows for relative movement between the first and second portions 34 and 36, thereby allowing for relative movement between the bushing 38 (and one of the terminal posts 18, 20), and the cover 16. Advantageously, the slack portion 40 allows for plate growth to occur, with corresponding terminal post movement, with minimal, or no stress generation in the cover 16.

Figure 3A:
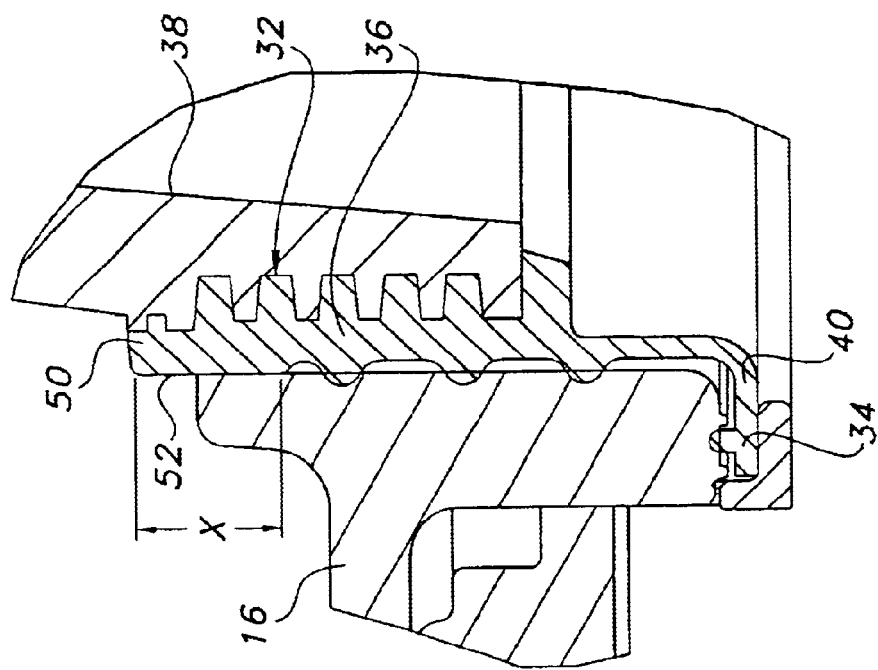
FIGS. 3a and 3b are partial cross-sectional views showing different positions of the sealing member.
Figure 3B:
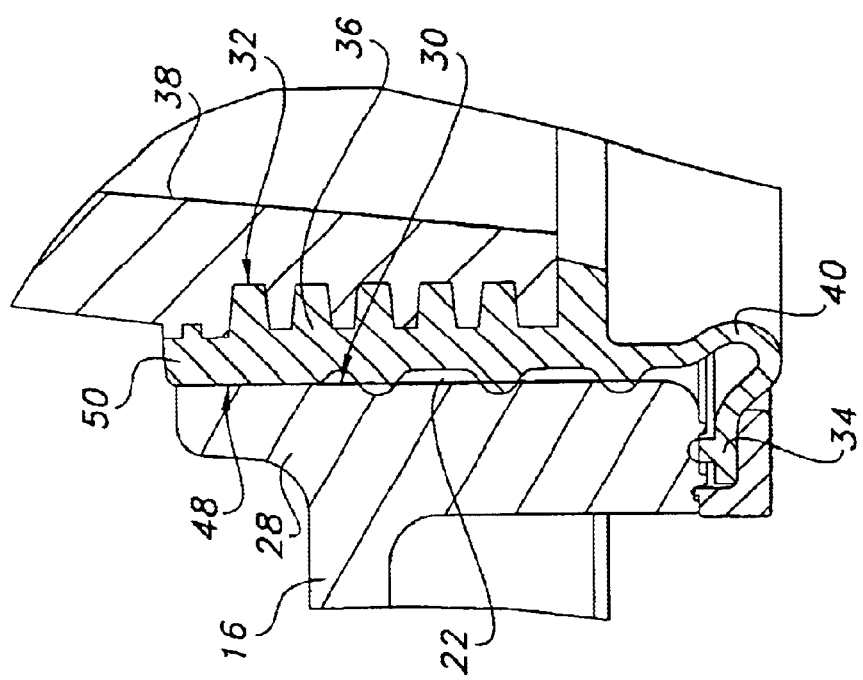

With reference to FIGS. 3a and 3b, the slack portion 40 becomes tauter with relative movement of the second portion 36 away from the first portion 34 of the sealing member 32. The slack portion 40 may have a sufficient length to allow for full expected movement of the respective terminal post 18, 20 as a result of plate growth over the life of the lead acid battery 10. As such, the taut, stressed state of the slack portion 40 shown in FIG. 3b will not be achieved until at or near the end of the battery's life, or not achieved at all (i.e., excessive slack is provided). Even with the slack portion 40 in a taut, stressed condition (FIG. 3b), the sealing member 32 still allows for some additional relative movement of the first and second portions 34 and 36 due to the inherent resiliency of its constituent elastomeric material.

It is preferred that at least a portion of an exterior surface 48 of the sealing member 32 be in continuous contact with the interior surface 30 of the collar 28. It is further preferred that contact between the exterior surface 48 and the interior surface 30 be continuously maintained at an opening 50 of the aperture 22. To this end, a top portion 52 of the exterior surface 48 extending from one end thereof is formed with a diameter at least equal to the interior surface 30 over a length X. It is also preferred that in an initial position of the sealing member 32 (FIG. 3a), which corresponds generally with the beginning of the life of the lead acid battery 10, the upper extent of the top portion 52 be generally aligned with the opening 50. Thus, with relative outward movement of the second portion 36, the top portion 52 remains in continuous contact with the interior surface 30 creating a seal at the opening 50. The length X should be at least as great as the expected movement of the respective terminal post 18, 20 as a result of plate growth over the life of the lead acid battery 10.

Figure 4:
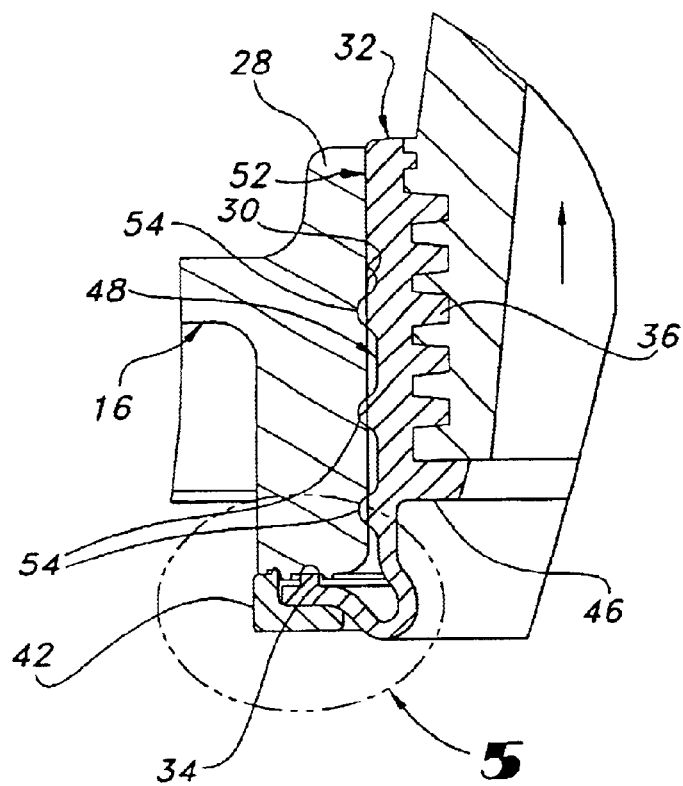
FIG. 4 is a sectional view of detail 4 taken from FIG. 2.

With reference to FIG. 4, it is preferred that at least one, and more preferably a plurality of beads 54 be formed on the exterior surface 48 of the sealing member 32 to engage the collar 28. As shown in the Figures, the beads 54 are preferably dimensioned greater than the interior surface 30 of the collar 28 so as to be in interferent engagement therewith. With the top portion 52 and the beads 54, a plurality of seal points may be defined between the sealing member 32 and the collar 28 to resist leakage therebetween. With the seal points being separated, frictional forces may be limited which inhibit movement of the second portion 36 outwardly. As an alternative, the exterior surface 48 may be formed smoothly to engage the collar 28 in full face-to-face engagement.

It is further preferred that at least one of the interior surface 30 and the exterior surface 48 be tapered such that relative movement between the first and second portions 34 and 36 results in increasing interference, and thus, a greater sealing effect. Desirably, as shown in FIG. 4, the interior surface 30 is convergently tapered in a direction away from the interior of the lead acid battery 10. As a result, with the second portion 36 moving outwardly in response to plate growth (as shown by an arrow), the top portion 52 and the beads 54 come into tighter interferent engagement with the interior surface 30. Alternatively, the exterior surface 48 may be tapered. Optionally, both the interior surface 30 and the exterior surface 48 may be tapered in opposing orientations, or at different degrees of taper. As will be readily appreciated by those skilled in the art, any orientation of the interior surface 30 and the exterior surface 48 which allows for increasing interferent engagement therebetween is utilizable with the subject invention. As shown in the Figures, interferent engagement exists between the interior surface 30 and the exterior surface 48 at various points (e.g. top portion 52, beads 54); however, due to the internal resiliency of the sealing member 32, the sealing member 32 compresses to an appropriate size and shape within the interior surface 30.

Figure 5:
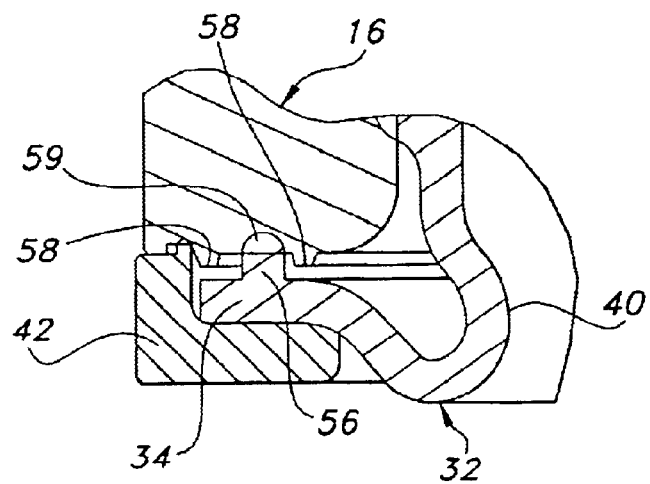
FIG. 5 is a sectional view of detail 5 taken from FIG. 4.

As an additional feature, with reference to FIG. 5, the first portion 34 of the sealing member 32 may be formed with at least one seal bead 56 configured to be disposed adjacent to at least one bead retention ring 58 (preferably in between two bead retention rings 58) defined on the cover 16 (e.g., at the collar 28). In this manner, upon forming a compression seal about the first portion 34 with the sealing ring 42 as described above, the seal bead 56 is disposed between the bead retention rings 58 enhancing the sealing effect about the first portion 34. As a further enhancement, a channel 59 may be formed in alignment with the seal bead(s) 56. In addition to, or as an alternative, the bead retention rings 58 may be formed on the first portion 34 and/or the sealing ring 42. With this arrangement, corresponding seal bead(s) 56 are formed on the cover 16, the first portion 34, and/or the sealing ring 42. The seal bead(s) 56, the bead retention rings 58, and the channel 59 collectively define a tortuous pathway which limits leakage.

With the preferred embodiment of the subject invention, three levels of sealing protection are provided about the aperture 22. A primary level of protection is provided between the exterior surface 48 of the sealing member 32 and the interior surface 30 of the collar 28. A secondary level of protection is provided by the seal compression about the first portion 34. While, a third level of protection is provided at the engagement between the sealing ring 42 and the cover 16. With a hermetic seal between the bushing 38 and the respective terminal post 18, 20, leakage pathways through the aperture 22 are eliminated.

Figure 6:
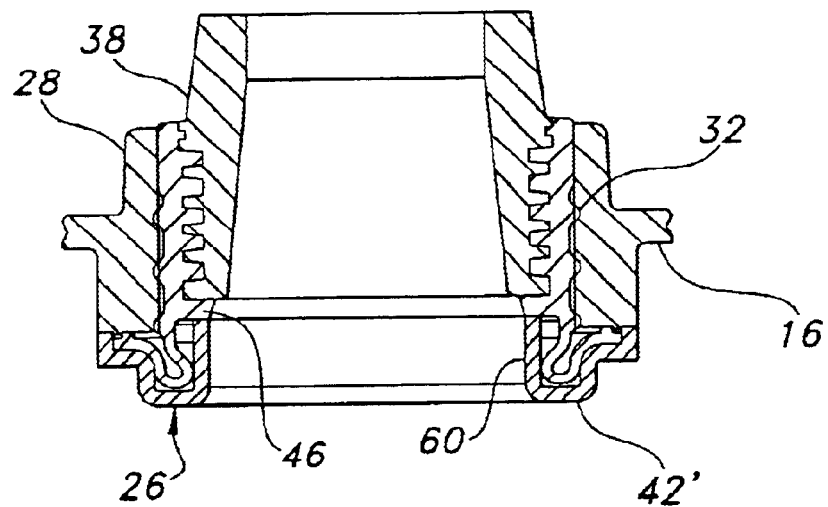
FIGS. 6 and 7 show different positions of a sealing arrangement utilizing an alternative sealing ring.
Figure 7:
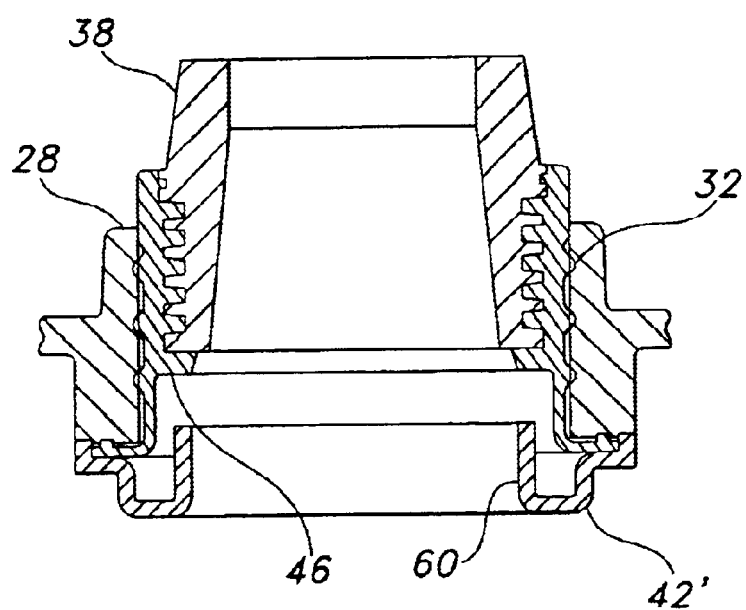

With reference to FIG. 6, an alternative embodiment of the sealing ring 42 is shown therein and designated as 42'. Here, the sealing ring 42' includes an inner upstanding member 60 which comes into actual or near abutting contact with the enlarged rib 46, with the sealing arrangement 26 being in an initial position. During the course of the lifetime of the lead acid battery 10, the enlarged rib 46 moves away from the sealing ring 42', as shown in FIG. 7. In all other respects, this embodiment is basically the same as that described above.

Figure 8:
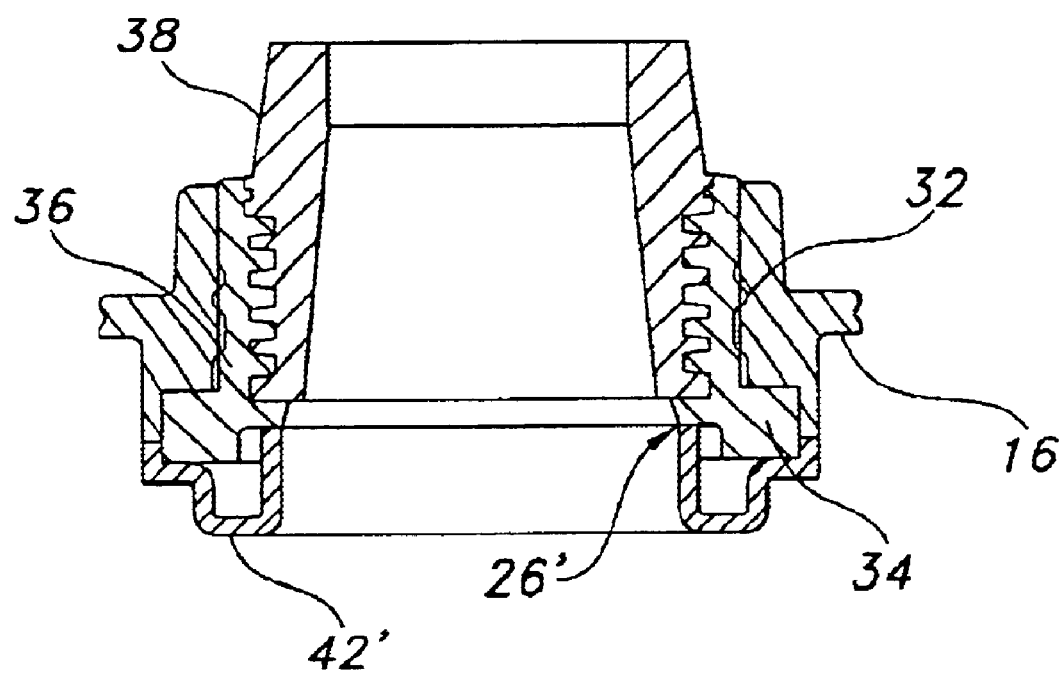
FIG. 8 shows a static post seal arrangement formed in accordance with the subject invention.

As a further variation of the subject invention, a static sealing arrangement 26' is disclosed. With reference to FIG. 8, no slack portion 40 is provided in the sealing member 32—the first and second portions 34, 36 are directly connected. Thus, relative movement between the first and second portions 34 and 36 is limited. The sealing arrangement 26' may be used to seal any terminal post 18, 20, although it may be better-suited for the negative terminal post 20 of the lead acid battery 10. Even though no slack portion is provided, inherent resiliency of the constituent elastomeric material of the sealing member 32 does allow for some relative motion between the first and second portions 34 and 36. This will suffice where the expected plate growth is relatively low. To provide additional flex, the first portion 34 may be formed relatively thicker than in the moveable sealing arrangement 26 described above with respect to FIGS. 1–7. In other respects, this embodiment may be practiced with the principles described above.

As is readily apparent, numerous modifications and changes may readily occur to those skilled in the art, and hence it is not desired to limit the invention to the exact construction and operation as shown and described, and accordingly, all suitable modification equivalents may be resorted to falling with the scope of the invention as claimed.

What is claimed is:

1. A lead acid battery comprising:
   a cover having at least one aperture formed therethrough;
   a bushing formed to receive a terminal post, said bushing disposed in registration with said aperture; and,
   an elastomeric sealing member which includes first and second portions, said first portion being rigidly fixed to said cover and said second portion being rigidly fixed to said bushing, and a slack portion extending between said first and second portions which allows for relative movement between said first and second portions.

2. A battery as in claim 1, wherein said slack portion is initially in an unstressed condition.

3. A battery as in claim 1, wherein said slack portion is formed with a predetermined length exceeding range of movement of a terminal post.

4. A battery as in claim 1, further including a sealing ring joined to said cover, said sealing ring applying compressive force to said first portion to rigidly fix said first portion to said cover.

5. A battery as in claim 4, wherein said sealing ring is hermetically sealed to said cover.

6. A battery as in claim 4, wherein a seal bead protrudes from said first portion.

7. A battery as in claim 6, wherein at least one bead retention ring is formed on said cover to be adjacent to said seal bead.

8. A battery as in claim 6, wherein at least one bead retention ring is formed on said sealing ring to be adjacent to said seal bead.

9. A battery as in claim 1, wherein a plurality of interdigitated ribs are defined by said bushing and said second portion to at least partially rigidly fix said second portion to said bushing.

10. A battery as in claim 9, wherein a sealing rib extends from said sealing member to at least partially overlap a lower surface of said bushing.

11. A battery as in claim 1, wherein said sealing member includes an exterior surface in at least partial contact with an interior surface of said aperture.

12. A battery as in claim 11, wherein a top portion of said exterior surface extending from one end of said sealing member is formed with a predetermined length exceeding range of movement of a terminal post.

13. A battery as in claim 11, wherein at least one bead protrudes from said exterior surface.

14. A battery as in claim 11, wherein at least one of said interior surface and said exterior surface is at least partially tapered such that relative movement between said aperture and said sealing member causes increasing interferent engagement.

15. A battery as in claim 11, wherein said interior surface is convergently tapered in a direction away from an interior of the battery.

16. A battery as in claim 1, wherein said sealing member is of a different material from said cover.

17. A lead acid battery comprising:
   a cover having at least one aperture formed therethrough, and a collar protruding from said cover which at least partially bounds said aperture;
   a bushing formed to receive a terminal post; and,
   a sealing member disposed at least partially between said bushing and said collar, at least one of an interior surface of said collar and an exterior surface of said sealing member being at least partially tapered such that relative movement between said collar and said sealing member causes increasing interferent engagement.

18. A battery as in claim 17, wherein said sealing member includes first and second portions, said first portion being rigidly fixed to said cover and said second portion being rigidly fixed to said bushing.

19. A battery as in claim 18, wherein said sealing member further includes a slack portion extending between said first and second portions which allows for relative movement between said first and second portions.

20. A battery as in claim 19, wherein said slack portion is initially in an unstressed condition.

21. A battery as in claim 19, wherein said slack portion is formed with a predetermined length exceeding range of movement of a terminal post.

22. A battery as in claim 18, wherein said first and second portions are directly connected.

23. A battery as in claim 18, further including a sealing ring joined to said cover, said sealing ring applying compressive force to said first portion to rigidly fix said first portion to said cover.

24. A battery as in claim 23, wherein said sealing ring is joined to said collar.

25. A battery as in claim 23, wherein said sealing ring is hermetically sealed to said cover.

26. A battery as in claim 23, wherein a seal bead protrudes from said first portion.

27. A battery as in claim 26, wherein at least one bead retention ring is formed on said cover to be adjacent to said seal bead.

28. A battery as in claim 27, wherein said at least one bead retention ring is formed on said collar.

29. A battery as in claim 26, wherein at least one bead retention ring is formed on said sealing ring to be adjacent to said seal bead.

30. A battery as in claim 18, wherein a plurality of interdigitated ribs are defined by said bushing and said second portion to at least partially rigidly fix said second portion to said bushing.

31. A battery as in claim 30, wherein a sealing rib extends from said sealing member to at least partially overlap a lower surface of said bushing.

32. A battery as in claim 17, wherein said sealing member includes an exterior surface in at least partial contact with an interior surface of said collar.

33. A battery as in claim 32, wherein a top portion of said exterior surface extending from one end of said sealing member is formed with a predetermined length exceeding range of movement of a terminal post.

34. A battery as in claim 32, wherein at least one bead protrudes from said exterior surface.

35. A battery as in claim 17, wherein said interior surface is convergently tapered in a direction away from an interior of the battery.

36. A battery as in claim 17, wherein said sealing member is formed of an elastomer.

37. A lead acid battery comprising:
 a cover having at least one aperture formed therethrough;
 a bushing formed to receive a terminal post, said bushing disposed in registration with said aperture;
 an elastomeric sealing member at least partially disposed between said bushing and said cover; and,
 a sealing ring joined to said cover, said sealing ring applying compressive force to a first portion of said sealing member to rigidly fix said first portion to said cove.

38. A battery as in claim 37, wherein said sealing member further includes a second portion rigidly fixed to said bushing.

39. A battery as in claim 38, wherein said sealing member further includes a slack portion extending between said first and second portions which allows for relative movement between said first and second portions.

40. A battery as in claim 39, wherein said slack portion is initially in an unstressed condition.

41. A battery as in claim 39, wherein said slack portion is formed with a predetermined length exceeding range of movement of a terminal post.

42. A battery as in claim 38, wherein said first and second portions are directly connected.

43. A battery as in claim 37, wherein said sealing ring is hermetically sealed to said cover.

44. A battery as in claim 37, wherein a seal bead protrudes from said first portion.

45. A battery as in claim 43, wherein at least one bead retention ring is formed on said cover to be adjacent to said seal bead.

46. A battery as in claim 44, wherein at least one bead retention ring is formed on said sealing ring to be adjacent to said seal bead.

47. A battery as in claim 38, wherein a plurality of interdigitated ribs are defined by said bushing and said second portion to at least partially rigidly fix said second portion to said bushing.

48. A battery as in claim 47, wherein a sealing rib extends from said sealing member to at least partially overlap a lower surface of said bushing.

49. A battery as in claim 37, wherein said sealing member includes an exterior surface in at least partial contact with an interior surface of said aperture.

50. A battery as in claim 49, wherein a top portion of said exterior surface extending from one end of said sealing member is formed with a predetermined length exceeding range of movement of a terminal post.

51. A battery as in claim 49, wherein at least one bead protrudes from said exterior surface.

52. A battery as in claim 49, wherein at least one of said interior surface and said exterior surface is at least partially tapered such that relative movement between said aperture and said sealing member causes increases interferent engagement.

53. A battery as in claim 49, wherein said interior surface is convergently tapered in a direction away from an interior of the battery.

* * * * *

UNITED STATES PATENT AND TRADEMARK OFFICE
CERTIFICATE OF CORRECTION

PATENT NO. : 6,806,000 B2
DATED : October 19, 2004
INVENTOR(S) : Misra et al.

It is certified that error appears in the above-identified patent and that said Letters Patent is hereby corrected as shown below:

<u>Column 8,</u>
Lines 5-6, delete "...fix said first portion to said cove." and insert -- fix said first portion to said cover. --

Signed and Sealed this

First Day of March, 2005

JON W. DUDAS
*Director of the United States Patent and Trademark Office*